United States Patent
Peiffer et al.

(10) Patent No.: US 6,537,647 B2
(45) Date of Patent: *Mar. 25, 2003

(54) POLYESTER FILM WITH SURFACE TOPOGRAPHY MATCHED TO THE INTENDED USE, THE USE OF THE FILM AND PROCESS FOR ITS PRODUCTION

(75) Inventors: Herbert Peiffer, Mainz (DE); Cynthia Bennett, Alzey (DE); Gottfried Hilkert, Saulheim (DE)

(73) Assignee: Mitsubishi Polyester Film GmbH, Wiesbaden (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/274,772

(22) Filed: Mar. 24, 1999

(65) Prior Publication Data

US 2002/0122932 A1 Sep. 5, 2002

(30) Foreign Application Priority Data

Mar. 25, 1998 (DE) .......................................... 198 13 264

(51) Int. Cl.⁷ ........................... B32B 5/02; B32B 27/06; B32B 27/36; B32B 31/14; B32B 31/30

(52) U.S. Cl. ....................... 428/141; 428/323; 428/336; 428/480; 428/694 SL; 428/694 SG; 428/910; 156/244.24; 264/211.12

(58) Field of Search ................................ 428/336, 480, 428/35.9, 694 SL, 694 SG, 910, 35.7, 323, 141; 156/244.24; 264/211.12

(56) References Cited

U.S. PATENT DOCUMENTS

| | | | |
|---|---|---|---|
| 3,515,626 A | 6/1970 | Duffield ........................ | 428/325 |
| 3,958,064 A | 5/1976 | Brekken et al. ............ | 428/336 |
| 4,042,569 A | 8/1977 | Bell et al. ................... | 428/480 |
| 4,252,885 A | 2/1981 | McGrail et al. ............ | 430/160 |
| 4,399,179 A | 8/1983 | Minami et al. ............. | 428/212 |
| 4,493,872 A | 1/1985 | Funderburk et al. ........ | 428/332 |
| 4,615,939 A | 10/1986 | Corsi et al. .................. | 428/323 |
| 4,622,237 A | 11/1986 | Lori ............................. | 427/40 |
| 5,069,962 A | 12/1991 | Okazaki et al. ............. | 428/323 |
| 5,236,680 A | 8/1993 | Nakazawa et al. ........ | 423/328.1 |
| 5,236,683 A | 8/1993 | Nakazawa et al. .......... | 423/335 |
| 5,242,757 A | 9/1993 | Buisine et al. .............. | 428/480 |
| 5,429,785 A | 7/1995 | Jolliffe ........................ | 264/216 |
| 5,453,260 A | 9/1995 | Nakazawa et al. ........ | 423/327.1 |
| 5,468,527 A | 11/1995 | Peiffer et al. ............... | 428/35.7 |
| 5,506,014 A | 4/1996 | Minnick ....................... | 428/35.7 |
| 5,753,377 A | 5/1998 | Takahashi et al. .......... | 428/480 |
| 5,955,181 A | * 9/1999 | Peiffer et al. ................ | 428/212 |
| 6,054,212 A | * 4/2000 | Peiffer et al. ................ | 428/336 |
| 6,149,995 A | 11/2000 | Peiffer et al. .............. | 428/35.8 |

FOREIGN PATENT DOCUMENTS

| | | |
|---|---|---|
| DE | 1694404 | 4/1971 |
| DE | 2230970 | 2/1973 |
| DE | 3801535 | 7/1988 |
| DE | 4306155 | 9/1994 |
| EP | 0 035 835 | 9/1981 |
| EP | 0 061 769 | 10/1982 |
| EP | 0 088 635 | 9/1983 |
| EP | 0 124 291 | 11/1984 |
| EP | 0 135 451 | 3/1985 |
| EP | 0 144 878 | 6/1985 |
| EP | 0 236 945 | 9/1987 |
| EP | 0 296 620 | 12/1988 |
| EP | 0 347 646 | 12/1989 |

(List continued on next page.)

OTHER PUBLICATIONS

Derwent Abstract of EP 0 878 298, Nov. 1998.
Derwent Abstract of EP 0 878 297, Nov. 1998.
Bursch et al., "Biaxially Oriented Polyester Film for SMD Condensers—Made by Extrusion Followed by Biaxial Stretching and Heat Fixing to Give Specified Shrinkage Parameters in the Machine Direction and Transverse Direction." Derwent Abstract, WPI Acc. No. 98–194495/199818 Dec. 1998.
Database WPI, Section Ch, Week 9615, Derwent Publications Ltd., London, GB; AN 96–148338, XP002114377 & JP 08 03679 A (Toray Indus., Inc.) (Feb. 6, 1996).
Database WPI, Section Ch, Week 9522, Derwent Publications Ltd., London, GB; AN 95–166886, XP002114408 & JP 07 088592 A (Toray Indus., Inc.) (Apr. 4, 1995).
Weiss, J., *Parameters that influence the barrier properties of metallized polyester and polypropylene films*, Thin Solid Films, vol. 204, 203–216 Dec. 1991.
Kimura, S.F. et al., *FTIR Spectroscopic Study on Crystallization Process of Poly (ethylene–2,6–napthalate)*, Journal of Polymer Science: Polymer Physics, vol. 35, 2741–2747 Dec. 1997.

*Primary Examiner*—Stevan A. Resan
*Assistant Examiner*—Ramsey Zacharia
(74) *Attorney, Agent, or Firm*—Finnegan, Henderson, Farabow, Garrett & Dunner, L.L.P.

(57) ABSTRACT

The application discloses a transparent, biaxially oriented polyester film having a base layer at least 80% by weight of which is composed of a thermoplastic polyester, and having at least one outer layer, wherein the outer layer is composed of a polymer or a mixture of polymers which comprises at least 40% by weight of ethylene 2,6-naphthalate units and up to 60% by weight of ethylene terephthalate units and/or units from cycloaliphatic or aromatic diols and/or dicarboxylic acids, with the proviso that the $T_g2$ value of the polyester film is above the $T_g2$ value of the base layer but below the $T_g2$ value of the outer layer, where the base layer comprises particles and the $R_a$ value of at least one surface is between 1 and 1000. The film has low gas transmission. It is particularly suitable for packaging uses, specifically for packaging foodstuffs and other consumable items, or as magnetic tape film and as capacitor film.

17 Claims, No Drawings

FOREIGN PATENT DOCUMENTS

| | | |
|---|---|---|
| EP | 0 378 154 | 7/1990 |
| EP | 0 378 955 | 7/1990 |
| EP | 0 402 861 | 12/1990 |
| EP | 0 490 665 | 6/1992 |
| EP | 0 502 745 | 9/1992 |
| EP | 0 514 129 | 11/1992 |
| EP | 0 515 096 | 11/1992 |
| EP | 0 580 404 | 1/1994 |
| EP | 0 602 964 A1 | 6/1994 |
| EP | 0 604 057 | 6/1994 |
| EP | 0 609 060 | 8/1994 |
| EP | 0 612 790 | 8/1994 |
| EP | 0 659 810 | 6/1995 |
| EP | 0 663 286 | 7/1995 |
| EP | 0 685 509 | 12/1995 |
| EP | 0 707 979 | 4/1996 |
| EP | 0 826 478 | 3/1998 |
| EP | 0 878 297 | 11/1998 |
| EP | 0 878 298 | 11/1998 |
| WO | WO 88/10188 | 12/1988 |
| WO | WO 94/13476 | 6/1994 |
| WO | WO 94/13481 | 6/1994 |
| WO | WO 98/13414 | 4/1998 |
| WO | WO 98/13415 | 4/1998 |

* cited by examiner

POLYESTER FILM WITH SURFACE TOPOGRAPHY MATCHED TO THE INTENDED USE, THE USE OF THE FILM AND PROCESS FOR ITS PRODUCTION

The invention relates to a transparent, biaxially oriented polyester film having a base layer at least 80% by weight of which is composed of a thermoplastic polyester, and having an outer layer, where the surface topography of at least one surface has been matched to the intended use. The invention furthermore relates to the use of the film and to a process for its production

BACKGROUND OF THE INVENTION

In many cases, there is demand for films to have a high barrier effect with respect to gases, water vapor and flavors. For this reason, use is usually made of polypropylene films which are metalized or coated with polyvinylidene chloride (PVDC). However, metalized polypropylene films are not transparent and are therefore not used in cases where the view of the contents is likely to have added promotional effect. Although films coated with PVDC are transparent, the coating, like the metalizing, takes place in a second operation which makes the packaging markedly more expensive. Ethylene-vinyl alcohol copolymers (EVOH) likewise exhibit a strong barrier effect. However, films modified with EVOH are particularly highly sensitive to moisture, and this limits their range of application. In addition, because of their poor mechanical properties they have relatively high thickness or have to be laminated with other materials at high cost, and they are also difficult to dispose of after use. In addition to this, some raw materials are not approved by the authorities or are unsuitable for producing food and drink packaging.

Magnetic tape films and capacitor films are generally metalized or coated. However, films made purely from polyester have the disadvantage here that moisture passes via the edges of the films into their interior, and diffuses from there to the film/metal (coating) interface, where the metal (coating) is hydrolytically-oxidatively attacked and, over time, destroyed, causing total failure of the magnetic tape or of the capacitor. High temperatures accelerate this phenomenon.

There is therefore a demand for packaging films, capacitor films and magnetic tape films which, at least on one of their surfaces, have a barrier layer which has a good barrier effect with respect to gases, such as $O_2$, $CO_2$, etc., water vapor and flavors, and at the same time have a surface topography which makes them suitable for the respective application sector (packaging, capacitor or magnetic tape).

DESCRIPTION OF THE INVENTION

The object is achieved by means of a biaxially oriented polyester film having a base layer at least 80% by weight of which is composed of (at least) a thermoplastic polyester, and having at least one outer layer, wherein the outer layer(s) is (are) composed of a polymer or a mixture of polymers which comprises at least 40% by weight of ethylene 2,6-naphthalate units and up to 40% by weight of ethylene terephthalate units and/or up to 60% of units from aliphatic, including cycloaliphatic, or aromatic diols and/or dicarboxylic acids, with the proviso that the $T_g2$ (glass transition temperature) value of the polyester film is above the $T_g2$ value of the base layer but below the $T_g2$ value of the outer layer, where the base layer comprises particles and the Ra value of at least one surface is between 1 and 1000 nm. The novel film generally has an oxygen permeability of less than 80 $cm^3/(m^2\ bar\ d)$, preferably less than 75 $cm^3/(m^2\ bar\ d)$, particularly preferably less than 70 $cm^3/(m^2\ bar\ d)$.

Preference is given to a polyester film in which the polymers of the outer layer comprise at least 65% by weight of ethylene 2,6-naphthalate units and up to 35% by weight of ethylene terephthalate units. Among these, particular preference is then given to a polyester film of the type in which the polymers of the outer layer comprise at least 70% by weight of ethylene 2,6-naphthalate units and up to 30% by weight of ethylene terephthalate units. The outer layer may, however, also be composed completely of ethylene 2,6-naphthalate polymers. Examples of suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol), or branched aliphatic glycols having up to 6 carbon atoms, and cycloaliphatic diols having one or more rings and if desired containing heteroatoms. Among the cycloaliphatic diols, mention may be made of cyclohexanediols (in particular 1,4-cyclohexanediol). Examples of suitable aromatic diols are those of the formula HO—$C_6H_4$—X—$C_6H_4$—OH where X is —$CH_2$—, —$C(CH_3)_2$—, —$C(CF_3)_2$—, —O—, —S— or —$SO_2$—. Besides these, bisphenols of the formula HO—$C_6H_4$—$C_6H_4$—OH are also very suitable.

Preferred aromatic dicarboxylic acids are benzenedicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids, mention may be made of cyclohexanedicarboxylic acids (in particular cyclohexane-1,4-dicarboxylic acid). Among the aliphatic dicarboxylic acids, the $C_3$–$C_{19}$-alkanedioic acids are particularly suitable, where the alkane moiety may be straight-chain or branched.

The present invention also provides a process for producing this film. It encompasses
  a) producing a film from base and outer layer(s) by coextrusion,
  b) biaxial orientation of the film and
  c) heat-setting of the oriented film.

To produce the outer layer, it is expedient to feed granules of polyethylene terephthalate and polyethylene 2,6-naphthalate directly to the extruder in the desired mixing ratio. At about 300° C. and with a residence time of about 5 min, the two materials can be melted and can be extruded. Under these conditions, transesterification reactions can occur in the extruder and during these copolymers are formed from the homopolymers.

The polymers for the base layer are expediently fed in via another extruder. Any foreign bodies or contamination which may be present can be filtered off from the polymer melt before extrusion. The melts are then extruded through a coextrusion die to give flat melt films and are layered one upon the other. The coextruded film is then drawn off and solidified with the aid of a chill roll and other rolls if desired.

The biaxial orientation is generally carried out sequentially or simultaneously. For the sequential stretching, it is preferable to orient firstly in a longitudinal direction (i.e. in the machine direction) and then in a transverse direction (i.e. perpendicularly to the machine direction). This causes an orientation of the molecular chains. The orientation in a longitudinal direction may be carried out with the aid of two rolls running at different speeds corresponding to the stretching ratio to be achieved. For the transverse orientation, use is generally made of an appropriate tenter frame. For the simultaneous stretching, the film is stretched in a tenter frame simultaneously in a longitudinal direction and in a transverse direction, The temperature at which the orientation is carried out can vary over a relatively wide range and depends on the properties desired in the film. In general, the longitudinal stretching is carried out at from 80 to 130° C., and the transverse stretching at from 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. If desired, the transverse orientation may be followed by another longitudinal orientation and even a further transverse orientation.

During the subsequent heat-setting, the film is held for from 0.1 to 10 s at a temperature of from 150 to 250° C. The film is then wound up in a conventional manner.

A great advantage of this process is that it is possible to feed the extruder with granules, which do not block the machine.

The base layer of the film is preferably composed to an extent of at least 90% by weight of the thermoplastic polyester. Polyesters suitable for this are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethyl-cyclohexane and terephthalic acid (=poly-1,4-cyclohexanedimethylene terephthalate, PCDT), and also from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters which are composed to an extent of at least 90 mol %, preferably at least 95 mol %, of ethylene glycol units and terephthalic acid units or of ethylene glycol units and naphthalene-2,6-dicarboxylic acid units. The remaining monomer units are derived from other diols and/or dicarboxylic acids. Examples of suitable diol comonomers are diethylene glycol, triethylene glycol, aliphatic glycols of the formula $HO-(CH_2)_n-OH$, where n is an integer from 3 to 6, branched aliphatic glycols having up to 6 carbon atoms, aromatic diols of the formula $HO-C_6H_4-X-C_6H_4-OH$ where X is $-CH_2-$, $-C(CH_3)_2-$, $-C(CF_3)_2-$, $-O-$, $-S-$ or $-SO_2-$, or bisphenols of the formula $HO-C_6H_4-C_6H_4-OH$.

The dicarboxylic acid comonomer units are preferably derived from benzenedicarboxylic acids, naphthalenedicarboxylic acids, biphenyl-x,x'-dicarboxylic acids (in particular biphenyl-4,4'-dicarboxylic acid), cyclohexanedicarboxylic acids (in particular cyclohexane-1,4-dicarboxylic acid), diphenylacetylene-x,x'-dicarboxylic acids (in particular diphenylacetylene-4,4'-dicarboxylic acid), stilbene-x,x'-dicarboxylic acid or $C_1-C_{16}$-alkane-dicarboxylic acids, where the alkane moiety may be straight-chain or branched.

The polyesters may be prepared by the transesterification process. The starting materials for this are dicarboxylic esters and diols, which are reacted using the customary transesterification catalysts, such as salts of zinc, of calcium, of lithium and of manganese. The intermediates are then polycondensed in the presence of widely used polycondensation catalysts, such as antimony trioxide or titanium salts. The preparation may be carried out just as successfully by the direct esterification process in the presence of polycondensation catalysts, starting directly from the dicarboxylic acids and the diols.

For processing the polymers, it has proven useful to select the polymers for the base layer and the outer layer(s) in such a way that the viscosities of the respective polymer melts do not differ excessively. Otherwise it is likely that there will be flow disturbances or streaks on the finished film. To describe the viscosity ranges of the two melts, use is made of a modified solution viscosity (SV). The solution viscosity is a measure of the molecular weight of the respective polymer and correlates with the melt viscosity. The chemical make-up of the polymer used may result in other correlations. For commercially available polyethylene terephthalates which are suitable for producing biaxially oriented films, the SVs are in the range from 600 to 1000. To ensure satisfactory film quality, the SV of the copolymers for the outer layer should be in the range from 300 to 900, preferably between 400 and 800, in particular between 500 and 700. If desired, a solid phase condensation may be carried out on the respective granules in order to adjust the SVs of the materials as necessary. It is a general rule that the melt viscosities of the polymer melts for base and outer layer(s) should differ by not more than a factor of 5, preferably not more than a factor of from 2 to 3.

According to the invention, the base layer comprises pigments. Pigments are understood to be conventional inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, LiF, the calcium, barium, zinc or manganese salts of the dicarboxylic acids used, carbon black, titanium dioxide, kaolin, crosslinked polystyrene particles or crosslinked acrylate particles. These are either added as such to the base layer or pass into this via regenerated material. It is expedient for the particle concentration to be in the range from 0.0001 to 5% by weight (based on the base layer).

The polymers for the outer layer may be prepared in three different ways:

a) In copolycondensation, terephthalic acid, naphthalene-2,6-dicarboxylic acid, and ethylene glycol are placed in a reactor and, using the customary catalysts and stabilizers, are polycondensed to give a polyester. The terephthalate and naphthalate units are then randomly distributed in the polyester.

b) Polyethylene terephthalate (PET) and polyethylene 2,6-naphthalate (PEN), in the desired ratio, are melted together and mixed, either in a reactor or preferably in a melt kneader (twin-screw kneader) or in an extruder. Immediately after the melting, transesterification reactions between the polyesters begin. Initially, block copolymers are obtained, but as reaction time increases—depending on the temperature and mixing action of the agitator—the blocks become smaller, and long reaction times give a random copolymer. However, it is not necessary and also not always advantageous to wait until a random distribution has been achieved, since the desired properties are also obtained with a block copolymer. The resultant copolymer is then extruded from a die and granulated.

c) PET and PEN are mixed as granules in the desired ratio, and the mixture is fed to the extruder for the outer layer. Here, the transesterification to give the copolymer takes place directly during the production of the film. This process has the advantage of being very cost-effective, and generally gives block copolymers, the block length being dependent on the extrusion temperature, the mixing action of the extruder and the residence time in the melt.

In a preferred embodiment of the invention, from 0.1 to 20% by weight of the polymers of the base layer are identical with those of the outer layer. These are either directly admixed with the base layer during extrusion or are in any case present in the film due to addition of regenerated material. The proportion of these copolymers in the base layer is selected in such a way that the base layer has a partially crystalline character.

In another embodiment, the film encompasses, on the side facing away from the outer layer, another outer layer of polyethylene terephthalate, and this layer comprises pigments.

The novel film exhibits a surprisingly high oxygen barrier. If, in contrast, the polymers used for the outer layer(s) comprise(s) less than 40% by weight of ethylene 2,6-naphthalate units and more than 40% by weight of ethylene terephthalate units then in many cases, although the film has somewhat lower oxygen transmission than a standard polyester film (composed to an extent of 100% by weight of polyethylene terephthalate), the transmission is still much too high. It has even been found that the oxygen barrier is poorer than in a standard polyester film if the outer layer comprises from 30 to 40% by weight of ethylene 2,6-naphthalate units and from 60 to 70% by weight of ethylene terephthalate units. However, even under these circumstances there may be advantage in a film having an outer layer which comprises at least 5%, preferably between 5 and 40%, by weight of ethylene 2,6-naphthalate units and more than 40% by weight of ethylene terephthalate units, if the oxygen barrier does not play a decisive part in the application concerned.

In the novel films, moreover, the glass transition temperature $T_g$ of the (co)polymer or of the (co)polymers of the outer layer(s) differs from the prior art in being higher than the glass transition temperature $T_g$ of the polymers of the base layer. The glass transition temperature of the (co) polymers used for the outer layer(s) is preferably in the range from 80 to 120° C. In the DSC (differential scanning calorimetry) determination of the glass transition temperatures, the transitions of the two layers cannot be differentiated. Glass transitions which are determined on biaxially oriented, heat-set films in the first heating procedure (termed $T_g1$ below) are, due to crystallinity and also to molecular stresses in the amorphous fraction of the specimens, relatively small in size, distributed over a wide temperature range, and shifted to higher temperatures. Because of orientation effects in particular, they are not suitable for characterizing a polymer. The resolution of DSC analyzers is often insufficient to detect the glass transitions in the first heating procedure ($T_g1$) of the individual layers of the novel film, the transitions being "blurred" and small, due to orientation and crystallinity. If the specimens are melted and then rapidly cooled again to below their glass transition temperature (quenched), the orientation effects are eliminated. On renewed heating, glass transitions (designated $T_g2$ here) are then measured which have a greater intensity and are characteristic of the respective polymers. However, even here it is not possible to differentiate the glass transitions of the individual layers, since the layers mix on melting and the polyesters present therein enter into transesterification reactions with one another. It is fully sufficient, however, to compare the $T_g2$ of the entire coextruded films with the $T_g2$ of the polymer used for the base layer. In known films the $T_g2$ value of the base layer is higher than that of the coextruded film, whereas the $T_g2$ value of the outer layer is lower than that of the base layer and also than that of the coextruded film. Exactly the opposite of this applies for the novel film. Here, the $T_g2$ value of the coextruded film is higher than that of the base layer but lower than the $T_g2$ value of the outer layer.

Depending on application sector and desired topography, at least one outer layer or, if desired, both outer layers and, if expedient, also the base layer should, in addition, comprise customary additives, such as stabilizers and antiblocking agents. They are expediently added to the polymer or to the polymer mixture before melting takes place. Examples of stabilizers are phosphorus compounds, such as phosphoric acid and phosphoric esters. Typical antiblocking agents (also termed pigments in this context) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, LiF, the calcium, barium, zinc and manganese salts of the dicarboxylic acids used, carbon black, titanium dioxide, kaolin, crosslinked polystyrene particles or crosslinked acrylate particles.

The additives selected may also be mixtures of two or more different antiblocking agents or mixtures of antiblocking agents of the same make-up but of different particle size. The particles may be added to the individual layers in the customary concentrations, e.g. as glycolic dispersion during the polycondensation or via masterbatches during extrusion. Pigment concentrations of from 0.0001 to 5% by weight have proven particularly suitable. A detailed description of the antiblocking agents is found, for example, in EP-A-0 602 964.

Depending on the application sector for the film, which may be magnetic tape film, capacitor film or packaging film, the film surfaces have the surface topography (topographies) needed for this intended use. For example, a typical magnetic tape film should have, on at least one surface, a large number of small elevations; a capacitor film should have, on at least one surface, preferably on both surfaces, a moderate number of small elevations and a small number of large elevations; a typical packaging film may, for example, have, on one of its surfaces, a topography as described above for a capacitor film or a small number of relatively small elevations with a large base width.

These qualitative statements concerning typical surface topography may be expressed quantitatively in the following way:

For at least one surface of packaging films, the number N of elevations (per mm$^2$), and the height h (in μm) and the diameter d (in μm) of the elevations should be linked by the following equations:

$$-1-3.7 \cdot \log h/\mu m < \log N/mm^2 < 2.48-2.22 \log h/\mu m \text{ where } 0.05 \mu m < h < 1.00 \mu m \quad (1)$$

$$1.7-3.86 \log d/\mu m < \log N/mm^2 < 4.7-2.7 \log d/\mu m \text{ where } 0.2 \mu m < d < 10.0 \mu m \quad (2)$$

N in number/mm$^2$ h in μm d in μm

For the packaging films, it has moreover proven expedient for the film surface which is formed by the outer layer comprising ethylene 2,6-naphthalate (i.e. the barrier layer) to obey the following conditions:

$$\log N/mm^2 < 1.4-2.5 \log h/\mu m \text{ where } 0.05 \mu m < h < 1.00 \mu m \quad (3)$$

$$\log N/mm^2 < 3.4-2.4 \log d/\mu m \text{ where } 0.2 \mu m < d < 10.0 \mu m \quad (4)$$

N in number/mm$^2$ h in $\mu$m d in $\mu$m

If the number of elevations per mm$^2$ is below the value given in (1) and (2), then the processing performance of the films is unsatisfactory; if the number of elevations per mm$^2$ is higher than that in (1) and (2), then the optical properties of the film, i.e. its gloss and haze, are unsatisfactory. If the number of elevations per mm$^2$ is higher than the value established in (3) and (4), then the film is a poor barrier to gases.

For at least one surface of magnetic tape films, the number N of elevations per mm$^2$, the height h (in $\mu$m) and the diameter d (in $\mu$m) of the elevations should be linked by the following equations:

$$\ln 15-6\ h/\mu m < \ln N/mm^2 < \ln 35-11\ h/\mu m \text{ where } 0.05\ \mu m < h < 1.00\ \mu m \quad (5)$$

$$\ln 1200-d/\mu m < \ln N/mm^2 < \ln 20{,}000-2\ d/\mu m \text{ where } 0.2\ \mu m < d\ 10\ \mu m \quad (6)$$

where for (5) and (6) the total number of elevations N per mm$^2$ is between 8000 and 40,000.

If the number of elevations per mm$^2$ is less than the value given in (5) and (6), then the film blocks and cannot be wound; if N is higher than the value given in (5) and (6), then the electromagnetic properties of the magnetic tapes produced from this film are unsatisfactory. The magnetic tapes show "drop outs" and the signal/noise ratio is too low.

For at least one surface of capacitor films, the number N of elevations per mm$^2$, the height h (in $\mu$m) and the diameter d (in $\mu$m) of the elevations should be linked by the following equations:

$$0.3-2\ \log h/\mu m < \log N/mm^2 < 1-7\ \log h/\mu m \text{ where } 0.05\ \mu m < h < 1.00\ \mu m \quad (7)$$

$$3-2\ \log d/\mu m < \log N/mm^2 < 4-7\ \log d/\mu m \text{ where } 0.2\ \mu m < d < 10.0\ \mu m \quad (8)$$

where for (7) and (8) the total number of elevations N per mm$^2$ is between 5000 and 50,000.

If the number of elevations per mm$^2$ is less than the value given in (7) and (8), then the film can no longer be processed and/or wound; if N is above the value given in (7) and (8), then the capacitors produced from these films have poor capacitance.

The surface topographies described above are achieved by the addition (and/or the presence) of particles in the outer layer(s). The particles which may be used are in principle the pigments described above. Those which are particularly suitable for capacitor films and packaging films are precipitated silicas and, if desired, pyrogenic silicas, where the precipitated silicas expediently have particle sizes in the range from 0.5 to 10 $\mu$m and the pyrogenic silicas have secondary particle sizes of from 200 to 600 nm (with primary particle sizes of from 20 to 60 nm). The number of elevations which is required by the equations (1) to (4) and (7) to (8) may—in the case of conventional outer layer thicknesses in the range from 0.1 to 3 $\mu$m—be achieved by addition of the particles described above in concentrations of from 500 ppm to 20,000 ppm (based on the weight of the outer layer).

For magnetic tape films, calcium carbonate and, if desired, aluminum oxide are particularly suitable. The calcium carbonate particles usually have particle sizes in the range from 0.1 to 0.8 $\mu$m, and a narrow particle size distribution is desirable (d99<1 $\mu$m, ideally a monodisperse distribution). The aluminum oxide particles usually have secondary particle sizes in the range from 200 to 800 nm (with primary particle sizes in the range from 20 to 80 nm). The number of elevations required by the equations (5) and (6) may—in the case of usual outer layer thicknesses in the range from 0.1 to 3 $\mu$m—be achieved by addition of the particles described above in concentrations of from, respectively, 1000 to 10,000 ppm (for $CaCO_3$) and from 0 to 10,000 ppm (for $Al_2O_3$) (based in each case on the weight of the outer layer).

The film may be coated and/or corona- or flame-pretreated to establish other desired properties. Typical coatings are layers which promote adhesion, are antistatic, improve slip or have release action. These additional layers may be applied to the film by in-line coating using aqueous dispersions, before the transverse orientation.

The novel polyester film preferably also comprises a second outer layer. The structure, thickness and make-up of a second outer layer may be selected independently of the outer layer already present, and the second outer layer may likewise comprise the abovementioned polymers or polymer mixtures and particle systems, but these do not necessarily have to be identical with those of the first outer layer. The second outer layer may also comprise other commonly used outer layer polymers. The second outer layer may therefore have the same topography as the first outer layer or a different topography.

Between the base layer and the outer layer(s), there may also be an intermediate layer if desired. It may be composed of the polymers described for the base layers. In a particularly preferred embodiment, it is composed of the polyester used for the base layer. It may also comprise the customary additives described. The thickness of the intermediate layer is generally greater than 0.3 $\mu$m and is preferably in the range from 0.5 to 15 $\mu$m, in particular from 1.0 to 10 $\mu$m.

The thickness of the outer layer(s) is generally greater than 0.1 $\mu$m, is usually in the range from 0.2 to 6.0 $\mu$m, and is preferably in the range from 0.3 to 5.5 $\mu$m, in particular from 0.3 to 5.0 $\mu$m, and it is possible for the outer layers to have identical or different thicknesses.

The total thickness of the novel polyester film may vary within wide limits and depends on the application envisaged. It is preferably from 4 to 100 $\mu$m, in particular from 5 to 50 $\mu$m, preferably from 6 to 30 $\mu$m, the base layer preferably presenting a proportion of from about 40 to 90% of the total thickness.

A further advantage is that the production costs of the novel film are only insignificantly greater than those of a film made from standard polyester raw materials. The other properties of the novel film which are relevant to processing and use remain essentially unchanged or are even improved. In addition, it has been ensured that regenerated material can be used in a proportion of up to 50% by weight, preferably from 10 to 50% by weight, based on the total weight of the film in each case, in the production of the film without significant adverse effect on its physical properties.

The film has excellent suitability for packaging foodstuffs and other consumable items or as capacitor film or magnetic tape film.

The following methods were used to characterize the raw materials and the films:

The oxygen barrier was measured using a Mocon Modern Controls (USA) OX-TRAN 2/20 in accordance with DIN 53 380, Part 3.

The SV (solution viscosity) was determined by dissolving a specimen of polyester in a solvent (dichloroacetic acid). The viscosity of this solution and that of the pure solvent were measured in an Ubbelohde viscometer. The quotient (relative viscosity η rel) was determined from the two values, 1000 was subtracted from this, and the value multiplied by 1000. The result was the SV.

The coefficient of friction was determined according to DIN 53 375, 14 days after production.

The roughness $R_a$ of the film was determined in accordance with DIN 4768 with a cut-off of 0.25 mm.

The surface tension was determined using the "ink method" (DIN 53 364).

The haze of the film was measured in accordance with ASTM-D 1003-52. The Hölz haze was determined by a method based on ASTM-D 1003-52, but in order to utilize the most effective measurement range, measurements were made on four pieces of film laid one on top of the other, and a 1° slit diaphragm was used instead of a 4° pinhole.

Gloss was determined in accordance with DIN 67 530. The reflectance was measured as a optical characteristic value for a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

The glass transition temperatures $T_g 1$ and $T_g 2$ were determined using film specimens with the aid of DSC (differential scanning calorimetry). Use was made of a DuPont DSC 1090. The heating rate was 20 K/min and the specimen weight was about 12 mg. In the first heating procedure, the glass transition $T_g 1$ was determined. Many of the specimens showed an enthalpy relaxation (a peak) at the beginning of the step-like glass transition. The temperature taken as $T_g 1$ was that at which the step-like change in heat capacity—without reference to the peak-shaped enthalpy relaxation—achieved half of its height in the first heating procedure. In all cases, there was only a single glass transition stage in the thermogram in the first heating procedure. It is possible that the peak-shaped enthalpy relaxations obscured the fine structure of the step, or that the dissolution of the device was not adequate to separate the small, "blurred" transitions of oriented, crystalline specimens. To eliminate their heat history, the specimens were held at 300° C. for 5 minutes after the heating procedure, and then quenched with liquid nitrogen. The temperature for the glass transition $T_g 2$ was taken as the temperature at which the transition reached half of its height in the thermogram for the second heating procedure.

A scanning electron microscope and an image analysis system were used to determine the size distribution of elevations on film surfaces. Use is made of the XL30CP scanning electron microscope from Philips with an integrated image analysis program: AnalySIS from Soft-imaging System.

For these measurements, specimens of film are placed flat on a specimen holder. These are then metalized obliquely at an angle α with a thin metallic layer (e.g. of silver). α here is the angle between the surface of the specimen and the direction of diffusion of the metal vapor. This oblique metalization throws a shadow behind the elevation. Since the shadows are not yet electrically conductive, the specimen is then further sputtered or metalized with a second metal (e.g. gold), the second coating here impacting vertically onto the surface of the specimen in such a way that it does not result in any shadows in the second coating.

Scanning electron microscope (SEM) images are taken of the specimen surfaces prepared in this way. The shadows of the elevations are visible because of the contrast of the metallic materials. The specimen is oriented in the SEM so that the shadows run parallel to one edge of the image. The following conditions are set in the SEM for recording the image: secondary electron detector, operating distance 10 mm, acceleration voltage 10 kV and spot 4.5. The brightness and contrast are set in such a way that all of the information in the image is represented as gray values and the intensity of the background noise is sufficiently small for it not to be detected as a shadow. The length of the shadows is measured by image analysis. The threshold value for shadow identification is set at the point where the second derivative of the gray value distribution of the image passes through the zero point. Before shadow identification, the image is smoothed with an N×N filter (size 3, 1 iteration). A frame is set so as to ensure that elevations which are not reproduced in their entirety in the image are not included in the measurements. The enlargement of the size of frame and the number of images evaluated are selected in such a way that a total film surface of 0.36 mm² is evaluated.

The height of the individual elevations is computed from the individual shadow lengths using the following relationship:

$$h=(\tan \alpha)*L$$

where h is the height of the elevation, α is the metalization angle and L is the shadow length. The elevations registered in this way are classified so as to arrive at a frequency distribution. The classification is into classes of 0.05 μm width between 0 and 1 μm, the smallest class (from 0 to 0.05 μm) not being used for further evaluation calculations. The diameters of the elevations (the spread in the direction perpendicular to that in which the shadow has been thrown) are graded in a similar manner in classes of 0.2 μm width from 0 to 10 μm, the smallest class here again not being used for further evaluation.

The following examples illustrate the invention. The products used (trademarks and manufacturers) are given only once in each case, and then relate to the examples which follow.

EXAMPLE 1

The polymer for the outer layer was prepared by copolycondensation. For this, dimethyl terephthalate and 2,6-dimethyl naphthalenedicarboxylate were mixed in a reactor in a molar ratio of 0.54:1.00 (corresponding to a make-up of 30% by weight of ethylene terephthalate units and 70% by weight of ethylene 2,6-naphthalate units in the final copolymer), and then mixed with ethylene glycol and, as catalyst, 300 ppm of manganese acetate. The transesterification was carried out with stirring at from 160 to 250° C., at atmospheric pressure, and the methanol obtained during this process was distilled off. An equimolar amount of phosphoric acid, as stabilizer, and 400 ppm of antimony trioxide, as catalyst, were then added. The polycondensation was carried out with stirring at 280° C. and a pressure of less than 1 mbar. The molecular weight achieved could be determined by measuring the torque on the stirrer. After the reaction, nitrogen pressure was used to discharge the melt from the reactor, and it was then pelletized.

EXAMPLE 2

Commercially available polyethylene terephthalate pellets and polyethylene 2,6-naphthalate pellets were used. In each case, the pellets were crystallized and dried for about 4 h at a temperature of about 160° C. The two materials in a ratio of 30:70 (30% by weight of polyethylene terephthalate and 70% by weight of polyethylene 2,6-naphthalate) were then placed in a mixer, where they were homogenized by stirring. The mixture was then passed to a twin-screw compounder (ZSK from Werner and Pfleiderer, Stuttgart), where it was extruded at a temperature of about 300° C. and with a residence time of about 3 min. The melt was extruded and chipped. A copolymer was produced in the extrusion by reaction between the polyethylene terephthalate and polyethylene 2,6-naphthalate.

EXAMPLE 3

Example 2 was repeated, but, for production of the film, chips of polyethylene terephthalate and of polyethylene 2,6-naphthalate were fed in a mixing ratio of 3:7 directly to the single-screw extruder, where the two materials were extruded at about 300° C. The melt was filtered and extruded through a coextrusion die to give a flat film, and laid as outer layer onto the base layer. The coextruded film was discharged across the die lip and solidified on a chill roll. The residence time of the two polymers in the extrusion was about 5 min. Further processing steps were as given above. Here, too, the copolymer was produced in the extrusion under the conditions given.

EXAMPLE 4

Chips of polyethylene terephthalate were dried at 160° C. to a residual moisture of less than 50 ppm and fed to the extruder for the base layer. Besides this, chips of polyethylene terephthalate and polyethylene 2,6-naphthalate (in a weight ratio of 3:7) were likewise dried at 160° C. to a residual moisture of 50 ppm and fed to the two extruders for the outer layers. The extruder conditions for the outer layers were as in Example 3.

A transparent three-layer film of symmetrical structure and an overall thickness of 12 μm was then produced by coextrusion followed by stepwise orientation in the longitudinal and transverse directions. Each of the outer layers has a thickness of 2.0 μm.

Base layer:

| | |
|---|---|
| 95% by weight | of polyethylene terephthalate (RT 49 from Hoechst AG) having an SV of 800 and |
| 5% by weight | of masterbatch made from 99% by weight of polyethylene terephthalate and 1.0% by weight of silica particles (SYLOBLOC ® 44 H from Grace) having an average particle size of 4.5 μm. |

Outer layers:

| | |
|---|---|
| 70% by weight | of polyethylene 2,6-naphthalate (POLYCLEAR ® N 100 prepolymer from Hoechst AG) having an SV of 800, |
| 20% by weight | of polyethylene terephthalate having an SV of 800 and |
| 10% by weight | of masterbatch made from 99.0% by weight of polyethylene terephthalate and 1.0% by weight of silica particles having an average particle size of 2.0 μm. |

The individual steps were:

| | | | |
|---|---|---|---|
| Extrusion | Temperatures: | Outer layer: | 300° C. |
| | | Base layer: | 300° C. |
| | Temperature of the take-off roll: | | 30° C. |
| | Die gap width: | | 1 mm |
| | Temperature of the take-off roll: | | 30° C. |
| Longitudinal stretching | Temperature: | | 85–135° C. |
| | Longitudinal stretching ratio: | | 4.0:1 |

-continued

| | | |
|---|---|---|
| Transverse stretching | Temperature: | 85–135° C. |
| | Longitudinal stretching ratio: | 4.0:1 |
| Setting | Temperature: | 230° C. |

The film had the required gas barrier properties and fulfills the equations (1) to (4).

EXAMPLE 5

In a manner similar to that of Example 4, a three-layer film having an overall thickness of 12 μm was produced by coextrusion. The outer layer A had a thickness of 2.0 μm, the outer layer C a thickness of 1.5 μm.

Base layer:

| | |
|---|---|
| 100% by weight of | polyethylene terephthalate having an SV of 800 |

Outer layer A:

| | |
|---|---|
| 70% by weight of | polyethylene 2,6-naphthalate having an SV of 800, |
| 20% by weight of | polyethylene terephthalate having an SV of 800 and |
| 10% by weight of | masterbatch made from 99.0% by weight of polyethylene terephthalate and 1.0% by weight of silica particles having an average particle size of 2.0 μm. |

Outer layer C:

| | |
|---|---|
| 80% by weight of | polyethylene terephthalate having an SV of 800 and |
| 20% by weight of | masterbatch made from 99.0% by weight of polyethylene terephthalate and 1.0% by weight of silica particles, 50% of which had an average particle size of 2.5 μm and 50% of which had an average particle size of 1.0 μm. |

The process conditions for all layers were as in Example 4.

EXAMPLE 6

A coextruded film having the recipe of Example 5, where outer layer A was 2.0 μm thick and had the following make-up:

| | |
|---|---|
| 90% by weight of | polyethylene 2,6-napthalate having an SV of 800 and |
| 10% by weight of | masterbatch made from 99.0% by weight of polyethylene terephthalate and 1.0% by weight of silica particles having an average particle size of 1.0 μm, | was produced under the process conditions of Example 4.

EXAMPLE 7

A coextruded film having the recipe of Example 5, where outer layer A was 2.5 μm thick and had the following make-up:

| | |
|---|---|
| 90% by weight of | polyethylene 2,6-naphthalate having an SV of 800 and |
| 10% by weight of | masterbatch made from 99.0% by weight of polyethylene 2,6-naphthalate having an SV of 800 and 1.0% by weight of silica particles having an average particle size of 1.0 μm, | was produced under the process condition of Example 4, but the temperatures of longitudinal and transverse stretching were now raised by about 10° C.

EXAMPLE 8

A three-layer coextruded film having a base layer and two outer layers was produced in a manner similar to that of Example 5. The overall thickness of the film was 12 μm. Outer layer A had a thickness of 3 μm, and outer layer C of 1.5 μm.

Base layer:

| | |
|---|---|
| 100% by weight of | polyethylene terephthalate having an SV of 800 |

Outer layer A:

| | |
|---|---|
| 100% by weight of | polyethylene 2,6-naphthalate having an SV of 800 |

Outer layer C:

| | |
|---|---|
| 80% by weight of | polyethylene terephthalate having an SV of 800 and |
| 20% by weight of | masterbatch made from 99.0% by weight of polyethylene terephthalate and 1.0% by weight of silica particles, 50% of which had an average particle size of 2.5 μm and 50% of which had an average particle size of 1.0 μm. |

The process conditions for all layers were as given in Example 7.

EXAMPLE 9

A coextruded film was produced in a manner similar to that of Example 4, but the copolymer for the outer layers was now prepared as in Example 2. In other respects, the conditions corresponded to those in Example 4.

EXAMPLE 10

A coextruded film was produced in a manner similar to that of Example 4, but the copolymer for the outer layers was now prepared as in Example 1. In other respects, the conditions corresponded to those in Example 4.

EXAMPLE 11

A coextruded two-layer film having a base layer and an outer layer was produced in a manner similar to that of Example 4. The overall thickness of the film was 12 μm, the outer layer having a thickness of 3 μm.

Base layer:

| | |
|---|---|
| 80% by weight of | polyethylene terephthalate having an SV of 800 and |
| 20% by weight of | masterbatch made from 99.0% by weight of polyethylene terephthalate and 1.0% by weight of silica particles, 50% of which had an average particle size of 2.5 μm and 50% of which had an average particle size of 1.0 μm. |

Outer layer:

| | |
|---|---|
| 60% by weight of | polyethylene naphthalate having an SV of 800, |
| 30% by weight of | polyethylene terephthalate having an SV of 800 and |
| 10% by weight of | masterbatch made from 99.0% by weight of polyethylene terephthalate and 1.0% by weight of silica particles having an average particle size of 2.0 μm. |

The process conditions for all layers were as given in Example 4.

EXAMPLE 12

A three-layer film was produced as described in Example 7, but with the single exception that the thickness of outer layer A was only 1.0 μm.

Comparative Example 1C

A film was produced in a manner similar to that of Example 11. For outer layer A, however, use was made of a copolyester of 82% by weight of ethylene terephthalate and 18% by weight of ethylene isophthalate.

Comparative Example 2C

A film was produced in a manner similar to that of Example 11. For outer layer A, use was now made of a polymer mixture made from 70% by weight of ethylene terephthalate and 30% by weight of ethylene 2,6-naphthalate.

Comparative Example 3C

A film was produced in a manner similar to that of Example 11. For outer layer A, use was now made of a polymer mixture of 90% by weight of ethylene terephthalate and 10% by weight of ethylene 2,6-naphthalate.

Comparative Example 4C

A single-layer PET film was produced with the following layers:

| | |
|---|---|
| 80% by weight of | polyethylene terephthalate having an SV of 800 and |
| 20% by weight of | masterbatch made from 99.0% by weight of polyethylene terephthalate and 1.0% by weight of silica particles, 50% of which had an average particle size of 2.5 μm and 50% of which had an average particle size of 1.0 μm. |

Comparative Example 5C

A single-layer PEN film was produced with the following make-up:

| | |
|---|---|
| 80% by weight of | polyethylene 2,6-naphthalate having an SV of 1000 and |
| 20% by weight of | masterbatch made from 99.0% by weight of polyethylene 2,6-naphthalate and 1.0% by weight of silica particles, 50% of which had an average particle size of 2.5 μm and 50% of which had an average particle size of 1.0 μm. |

The film had very good barrier properties; however, due to high production costs it is unsuitable for food and drinks packaging.

The compositions and properties of the films produced in Examples 4 to 12 and 1C to 5C are given in Tables 1 and 2.

TABLE 1

| Example No. | Ethylene 2,6-naphthalate units in outer layer A (in % by weight) | Ethylene terephthalate units in outer layer A (in % by weight) | Ethylene isophthalate units in outer layer A (in % by weight) | $T_g$ (in °C.) |
|---|---|---|---|---|
| 4 | 70 | 30 | 0 | 82.5 |
| 5 | 70 | 30 | 0 | 81.0 |
| 6 | 90 | 10 | 0 | 86.0 |
| 7 | 100 | 0 | 0 | 90.0 |
| 8 | 100 | 0 | 0 | 90.0 |
| 9 | 70 | 30 | 0 | 82.5 |
| 10 | 70 | 30 | 0 | 82.5 |
| 11 | 60 | 40 | 0 | 83.0 |

TABLE 1-continued

| Example No. | Ethylene 2,6-naphthalate units in outer layer A (in % by weight) | Ethylene terephthalate units in outer layer A (in % by weight) | Ethylene isophthalate units in outer layer A (in % by weight) | $T_g$ (in °C.) |
|---|---|---|---|---|
| 12 | 100 | 0 | 0 | 86.0 |
| 1C | 0 | 82 | 0 | 72.0 |
| 2C | 30 | 0 | 0 | 81.0 |
| 3C | 10 | 50 | 0 | 80.5 |
| 4C | 100 | 0 | 0 | 80.0 |
| 5C | 0 | 100 | 0 | 115.0 |

TABLE 2

| Example No. | Film thickness (μm) | Outer layer thickness A/C(A) (μm) | Film structure | Oxygen permeability (cm³/m² bar d) | Gloss (60° angle of measurement) Side A | Gloss (60° angle of measurement) Side C | Haze |
|---|---|---|---|---|---|---|---|
| 4 | 12 | 2.0/2.0 | ABA | 70 | 175 | 175 | 2.5 |
| 5 | 12 | 2.0/1.5 | ABC | 80 | 174 | 175 | 2.6 |
| 6 | 12 | 2.0/1.5 | ABC | 65 | 176 | 175 | 2.5 |
| 7 | 12 | 2.5/1.5 | ABC | 55 | 155 | 155 | 4.0 |
| 8 | 12 | 3.0/1.5 | ABC | 45 | 160 | 155 | 4.0 |
| 9 | 12 | 2.0/2.0 | ABA | 70 | 175 | 175 | 2.5 |
| 10 | 12 | 2.0/2.0 | ABA | 70 | 175 | 175 | 2.5 |
| 11 | 12 | 3.0 | AB | 80 | 175 | 178 | 1.5 |
| 12 | 12 | 1.0/1.0 | ABC | 62 | 160 | 165 | 3.5 |
| 1C | 12 | 3.0 | AB | 102 | 145 | 160 | 3.0 |
| 2C | 12 | 3.0 | AB | 110 | 120 | 150 | 6.5 |
| 3C | 12 | 3.0 | AB | 95 | 175 | 175 | 1.5 |
| 4C | 12 | 0 | A | 100 | 175 | 178 | 4.0 |
| 5C | 12 | 0 | A | 30 | 175 | 178 | 4.0 |

What is claimed is:

1. A transparent, biaxially oriented polyester film comprising:
   (A) a base layer at least 80% by weight of which is composed of a thermoplastic polyester; and
   (B) at least one outer layer, wherein the outer layer is composed of a copolymer comprising at least 40% by weight of ethylene 2,6-naphthalate units; ethylene terephthalate units in an amount up to 40% by weight; and 0 to <60% by weight of units selected from cycloaliphatic diols, aromatic diols, dicarboxylic acids, or a combination thereof,
   wherein the glass transition temperature ($T_g2$ value) of the polyester film is above the $T_g2$ value of the base layer but below the $T_g2$ value of the outer layer, and
   the base layer comprises particles, but not solely $SiO_2$ particles having a mean particle diameter of 4.5 μm,
   where at least one film surface has an $R_a$ value of from 1 to 1000 nm, and
   wherein at least one side of the film has a number of elevations N per mm² which is correlated with their respective heights h and diameters d by the following equations $$-1 - 3.7 \cdot \log h/\mu m < \log N/mm^2 < 2.48 - 2.22 \log h/\mu m \text{ where } 0.05 \mu m < h < 1.00 \mu m \quad (1)$$

$$1.7 - 3.86 \log d/\mu m < \log N/mm^2 < 4.7 - 2.7 \log d/\mu m \text{ where } 0.2 \mu m < d < 10.0 \mu m. \quad (2)$$

2. A film as claimed in claim 1, wherein the outer layer comprises at least 65% by weight of ethylene 2,6-naphthalate units.

3. A film as claimed in claim 1, wherein the outer layer comprises at least 70% by weight of ethylene 2,6-naphthalate units.

4. A film as claimed in claim 1, which has an oxygen permeability of less than 80 cm³/(m² bar d).

5. A film as claimed in claim 1, which has an oxygen permeability of less than 75 cm³/(m² bar d).

6. A film as claimed in claim 1, which has an oxygen permeability of less than 70 cm³/(m² bar d).

7. A film as claimed in claim 1, wherein the outer layer has a thickness of from 0.2 to 6 μm.

8. A film as claimed in claim 1, wherein the outer layer has a thickness of from 0.3 to 5.5 μm.

9. A film as claimed in claim 1, wherein the outer layer has a thickness of from 0.3 to 5.0 μm.

10. A film as claimed in claim 1, which has two layers and is composed of the base layer and the outer layer.

11. A film as claimed in claim 1, which has three layers and is composed of the base layer and two outer layers, one on each of the two sides of the base layer.

12. A film as claimed in claim 1, wherein the $R_a$ value is between 30 and 80 nm.

13. A process for producing a biaxially oriented polyester film as claimed in claim 1, which comprises:
   (A) coextruding a film from the base layer and from the one or more outer layers;
   (B) orienting the film biaxially; and
   (C) heat-setting the oriented film.

14. A method for packaging foodstuffs and other consumable items, comprising packaging said foodstuffs and other consumable items in a film as claimed in claim 1.

15. A method for recording sound, data, or other information, comprising employing a film as claimed in claim 1 as magnetic tape film.

16. A method for making a capacitor film, which comprises making said capacitor film with a film as claimed in claim 1.

17. A transparent, biaxially oriented polyester film comprising:
   (A) a base layer at least 80% by weight of which is composed of a thermoplastic polyester; and
   (B) at least one outer layer, wherein the outer layer is composed of a copolymer comprising at least 40% by weight of ethylene 2,6-naphthalate units; ethylene terephthalate units in an amount up to 40% by weight; and 0 to <60% by weight of units selected from cycloaliphatic diols, aromatic diols, dicarboxylic acids, or a combination thereof, wherein the glass transition temperature ($T_g2$ value) of the polyester film is above the $T_g2$ value of the base layer but below the $T_g2$ value of the outer layer, and the base layer comprises particles, but not solely $SiO_2$ particles having a mean particle diameter of 4.5 μm, where at least one film surface has an $R_a$ value of from 1 to 1000 nm, and wherein the outer layer comprising polyethylene 2,6-naphthalate has a number of elevations N per mm² of film surface which is correlated with their respective heights h and diameters d by the following equations $$\log N/mm^2 < 1.4 - 2.5 \log h/\mu m \tag{3}$$

where 0.05 μm < h < 1.00 μm $$\log N/mm^2 < 3.4 - 2.4 \log d/\mu m \tag{4}$$

where 0.2 μm < d < 100 μm.

* * * * *

UNITED STATES PATENT AND TRADEMARK OFFICE
CERTIFICATE OF CORRECTION

PATENT NO.   : 6,537,647 B2
DATED        : March 25, 2003
INVENTOR(S)  : Herbert Peiffer, Cynthia Bennett and Gottfried Hilkert It is certified that error appears in the above-identified patent and that said Letters Patent is hereby corrected as shown below:

Column 15,
Line 63, "1.7-3.86 log d/$\mu$m" should read -- 1.7-3.86 • log d/$\mu$m --.

Column 18,
Line 12, "0.2 $\mu$m<d<100 $\mu$m" should read -- 0.2 $\mu$m<d<10.0 $\mu$m --.

Signed and Sealed this

Twenty-second Day of July, 2003

JAMES E. ROGAN
*Director of the United States Patent and Trademark Office*